M. Rich,
Saw-Mill Head-Block.
Nº 1,751. Patented Aug. 28, 1840.
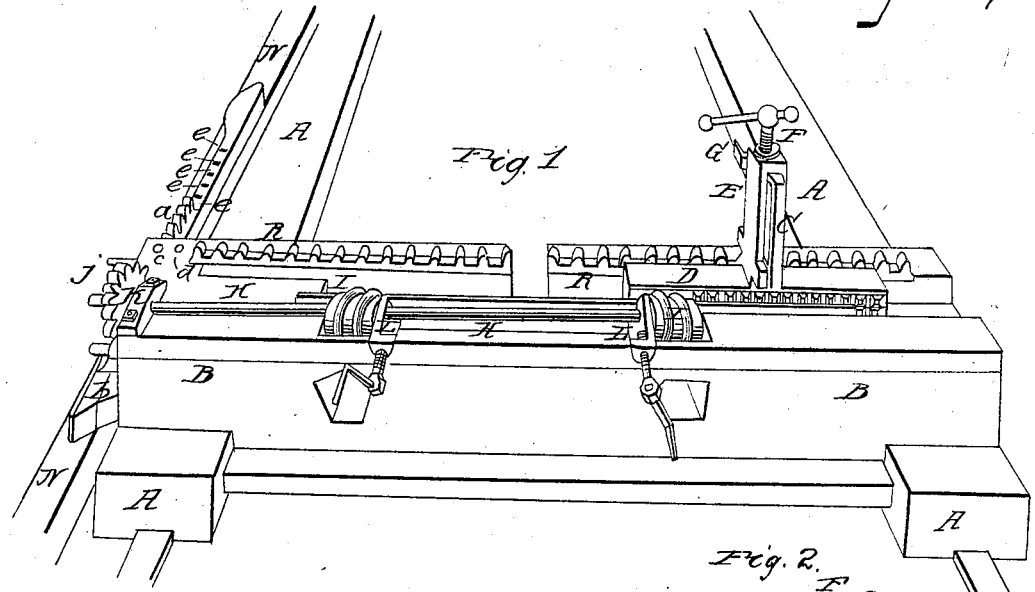
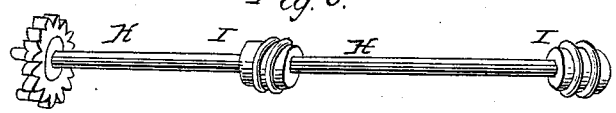
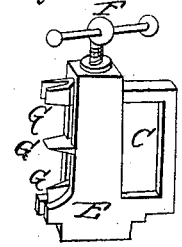
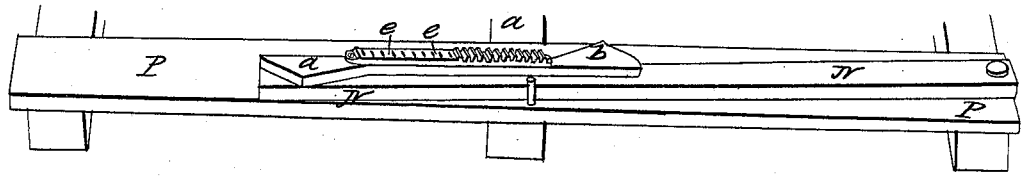

UNITED STATES PATENT OFFICE.

MARTIN RICH, OF ITHACA, NEW YORK.

SAWMILL-DOG FOR SETTING LOGS.

Specification of Letters Patent No. 1,751, dated August 28, 1840.

*To all whom it may concern:*

Be it known that I, MARTIN RICH, of Ithaca, in the county of Tompkins and State of New York, have made certain Improvements in the Manner of Constructing Dogs for Sawmills and also in the Manner of Setting the Logs to be Sawed; and I do hereby declare that the following is a full and exact description thereof.

In the accompanying drawing, Figure 1, represents the back end of a saw-mill carriage, with the tail block upon it, the main part of the setting apparatus and the improved dog. The head block is not shown, as on this the setting apparatus is similar to what is already known and used, and the dog may be of the same kind with that shown on the tail block.

A, A, is a part of the saw-mill carriage, and B, B, the tail block.

C, is the improved saw-mill dog, of which a side view is given in Fig. 2.

D, is a sliding plate of cast-iron, having teeth on one edge constituting a rack, into which the endless screws to be presently described are to work. This plate may be two feet long, about four inches wide, and an inch thick. It slides back and forth in suitable guide grooves on the tail block. From this plate rises the standard E, which is to contain the dog C. This standard may be eight inches high, and is, in preference, cast in one piece with the plate. It has a mortise, or opening, between its cheeks, or sides, which may be seven inches high and an inch and a quarter wide, for the dog to slide in. Through its top there is a screw F, to hold the dog; a wedge, however, may be substituted for this screw. The dog I make in the form of an oblong square frame, seven inches by ten; this frame is to slide easily through the mortise in the standard. It is furnished with teeth, as at G, G, for holding the log.

H, H, Figs. 1 and 3, is a shaft which runs along the tail block, and carries two endless screws I, I, one a right, and the other a left handed screw, either of which may take into the rack on the edge of the plate D. This shaft carries a wheel J, upon one end of it, which may be ten inches in diameter, and have twenty teeth on its periphery.

K, is a collar in which the shaft revolves, and L, L, are two sliding collars that embrace the shaft, and that may be moved out and in by the screws M, M; by means of these the respective endless screws I, I, are thrown into, or out of, gear with the rack on D, causing the log to be set in either direction, without changing the direction in which the shaft H, is made to revolve.

N, is a bar, or piece of scantling, which lies on the string piece on one side of the floor of the mill, and has a joint pin at its rear end, as shown at O, in Fig. 4, upon which pin said piece may vibrate on the string piece P, P. Upon the vibrating bar N, there is a rack Q, into which the teeth of the wheel J, are to mesh, for the purpose of turning the shaft H; but as the bar N, is made to vibrate this rack may be thrown into, or out of, gear with the wheel. To effect this, there are two projections a, and b, on opposite sides of the upper surface of the bar, which are operated upon by two pins, the upper ends of which are shown at c, and d, on the projecting end of the tail block; these pins extend down so as to embrace the vibrating bar N, between them. As a carriage goes forward, the pin d, comes in contact with the projection b, and throws the bar outward, so that the wheel J, passes clear of the rack. As it returns, the pin c, comes into contact with the projection a, and moves the bar and its rack inwards, so that the wheel J, engages with the rack Q, causes the shaft H, to revolve, and sets the log. The distance to which the log is moved will, of course, depend upon the degree of revolution given to the shaft, and this will be governed by the number of teeth in the rack Q. The respective parts of this gearing are so graduated that each tooth in the rack shall move the log one sixteenth of an inch. The teeth composing this rack are dropped into holes, or mortises, e, e, e, from which they may be removed at pleasure so as to lengthen, or shorten, the rack as may be desired.

R, R, Fig. 1, are notched, or toothed, bars of iron which I fix on the head and tail blocks to serve as fulcra to a crow-bar, in moving the log, and these afford great facility in this operation. I intend, sometimes, to construct the rack on the plate D, on its under side, in which case the shaft H, must be below it, and it may then be raised, or lowered, by means of wedges, so as to throw it in or out of gear.

Having thus fully described the nature of my improvements, and the manner in which they operate in producing the desired effect, what I claim therein as constituting my invention, is—

1. The manner in which I have constructed and arranged the improved dog, as set forth namely, the giving to it the form of a quadrangular frame, furnished with teeth on one side, and sliding through an opening or mortise, in a standard affixed to, or making a part of a sliding plate and rack by which the log is carried in setting; said dog being held in the required position by a screw or wedge.

2. I claim the arrangement and combination of the parts concerned in the log by the return motion of the carriage; said combination consisting of the shaft H, with its right, and left, handed screws; the cog wheel on its end, and the vibrating bar for throwing the rack Q, into and out of gear, operating substantially in the manner set forth.

3. I claim, in combination with the log-setting apparatus, the manner of constructing the rack Q with movable teeth, for the purpose herein fully made known.

In testimony whereof, I hereunto set my name, this seventh day of August, one thousand, eight hundred and forty.

MARTIN RICH.

Witnesses:
THOS. P. JONES,
GEORGE WEST.